US012393779B2

(12) United States Patent
Hirota et al.

(10) Patent No.: US 12,393,779 B2
(45) Date of Patent: Aug. 19, 2025

(54) SYSTEMS AND METHODS FOR MULTILINGUAL SENTENCE EMBEDDINGS

(71) Applicant: Recruit Co., Ltd., Tokyo (JP)

(72) Inventors: Wataru Hirota, Mountain View, CA (US); Yoshihiko Suhara, Los Altos, CA (US); Behzad Golshan, Mountain View, CA (US); Wang-Chiew Tan, San Jose, CA (US)

(73) Assignee: Recruit Co., Ltd., Tokyo (JP)

( * ) Notice: Subject to any disclaimer, the term of this patent is extended or adjusted under 35 U.S.C. 154(b) by 0 days.

(21) Appl. No.: 17/008,569

(22) Filed: Aug. 31, 2020

(65) Prior Publication Data

US 2022/0067279 A1   Mar. 3, 2022

(51) Int. Cl.
*G06F 17/00* (2019.01)
*G06F 40/263* (2020.01)

(52) U.S. Cl.
CPC ................. *G06F 40/263* (2020.01)

(58) Field of Classification Search
CPC ............. G06F 40/263; G06F 40/30
See application file for complete search history.

(56) References Cited

U.S. PATENT DOCUMENTS

| | | | | |
|---|---|---|---|---|
| 9,098,488 B2* | 8/2015 | Hamid | ..................... | G06F 40/58 |
| 10,789,410 B1* | 9/2020 | Ramaswamy | .......... | G06F 40/58 |
| 10,963,644 B2* | 3/2021 | Aghajanyan | ............ | G06F 40/30 |
| 10,997,980 B2* | 5/2021 | Wang | ..................... | G10L 17/18 |
| 2018/0307679 A1* | 10/2018 | Duong | ................... | G06N 3/082 |
| 2019/0013012 A1 | 1/2019 | Hwang et al. | | |
| 2019/0129947 A1* | 5/2019 | Shin | ....................... | G06F 40/284 |
| 2019/0163691 A1 | 5/2019 | Brunet et al. | | |
| 2019/0332677 A1* | 10/2019 | Farhan | .................... | G06F 40/51 |
| 2020/0081982 A1* | 3/2020 | Tu | ........................... | G06N 3/047 |

(Continued)

FOREIGN PATENT DOCUMENTS

| | | |
|---|---|---|
| JP | 2004511867 A | 4/2004 |
| JP | 2018036413 A | 3/2018 |

(Continued)

OTHER PUBLICATIONS

Artetxe, Mikel, and Holger Schwenk. "Massively multilingual sentence embeddings for zero-shot cross-lingual transfer and beyond." Transactions of the association for computational linguistics 7 (2019): 597-610 (Year: 2019).*

(Continued)

*Primary Examiner* — Andrew T McIntosh
(74) *Attorney, Agent, or Firm* — Finnegan, Henderson, Farabow, Garrett & Dunner, LLP (57) ABSTRACT

Disclosed embodiments relate to natural language processing. Techniques can include obtaining an encoding model, obtaining a first sentence in a first language and a label associated with the first sentence, obtaining a second sentence in a second language, encoding the first sentence and second sentence using the encoding model, determining the intent of the first encoded sentence, determining the language of the first encoded sentence and the language of the second encoded sentence, and updating the encoding model based on the determined intent of the first encoded sentence, the label, the determined language of the first encoded sentence, and the determined language of the second encoded sentence.

20 Claims, 6 Drawing Sheets

(56) References Cited

U.S. PATENT DOCUMENTS

| | | | |
|---|---|---|---|
| 2020/0226327 A1 | 7/2020 | Matusov et al. | |
| 2021/0157991 A1* | 5/2021 | Wang | G06N 3/047 |
| 2021/0165974 A1* | 6/2021 | Lee | G06F 40/58 |
| 2021/0390269 A1* | 12/2021 | Rezagholizadeh | G06N 3/08 |

FOREIGN PATENT DOCUMENTS

| | | |
|---|---|---|
| JP | 2019125317 A | 7/2019 |
| WO | WO 2002/31814 | 4/2002 |

OTHER PUBLICATIONS

Yang, Yinfei, et al. "Multilingual universal sentence encoder for semantic retrieval." arXiv preprint arXiv:1907.04307 (2019) (Year: 2019).*

Vulić, Ivan, and Marie-Francine Moens. "Monolingual and cross-lingual information retrieval models based on (bilingual) word embeddings." Proceedings of the 38th international ACM SIGIR conference on research and development in information retrieval. 2015 (Year: 2015).*

PCT Notification of Transmittal of the International Search Report and the Written Opinion, including the International Search Report and the Written Opinion, corresponding with PCT Application No. PCT/JP2021/030380 mailed Nov. 9, 2021. (8 pages).

Japanese Notice of Reasons for Refusal, dated Nov. 12, 2024, for Japanese Application No. 2020187647, filed May 17, 2017 (5 pages).

* cited by examiner

S1: What time is the pool open tonight? (pool)
S2: What time are the stores on 5th open tonight? (store)
S3: How late is the pool open? (pool)

Require: Training lang $t$, adversarial langs $\mathcal{L}$, iteration number $k$, clipping interval $c$.

1: for 1 to $k$ do
2:   Sample training sentences as $x^t$
3:   Sample adversarial language $\ell$ from $\mathcal{L}$
4:   Sample adversarial sentences as $x^\ell$
5:   $u^t \leftarrow E(x^t); \quad u^\ell \leftarrow E(x^\ell)$
6:   Evaluate loss $L_{D_\ell}(u^t, u^\ell)$
7:   Update $D_\ell$ parameters
8:   Clip $D_\ell$ parameters to $[-c, c]$
9:   Sample training sentences and labels as $x^t$ and $y^t$
10:   Sample adversarial language $\ell$ from $\mathcal{L}$
11:   Sample adversarial sentences as $x^\ell$
12:   $u^t \leftarrow E(x^t); \quad u^\ell \leftarrow E(x^\ell)$
13:   Evaluate loss $L_{C+D_\ell}(u^t, u^\ell, y^t)$
14:   Update $E$ and $C$ parameters

Fig. 6

SYSTEMS AND METHODS FOR MULTILINGUAL SENTENCE EMBEDDINGS

BACKGROUND

Natural language processing systems allow computers to analyze natural language input by relying on representations of textual sentences as sentence embeddings. Many of these systems and embeddings include multilingual support. But there is a need for systems that create and train multilingual embedding models without requiring multilingual training data and without creating a textual similarity bias in the model.

SUMMARY

Certain embodiments of the present disclosure relate to a non-transitory computer readable storage medium storing instructions that are executable by a multilingual sentence embedding system that includes one or more processors to cause the review comprehension system to perform a method for sentence embedding. The method can include obtaining an encoding model, obtaining a first sentence in a first language and a label associated with the first sentence, obtaining a second sentence in a second language, encoding the first sentence and second sentence using the encoding model, determining the intent of the first encoded sentence, determining the language of the first encoded sentence and the language of the second encoded sentence, and updating the encoding model based on the determined intent of the first encoded sentence, the label, the determined language of the first encoded sentence, and the determined language of the second encoded sentence.

According to some disclosed embodiments, the first language and the second language can be the same.

According to some disclosed embodiments, the first language and the second language can be different.

According to some disclosed embodiments, the determined language of the first encoded sentence can be the same as the determined language of the second encoded sentence.

According to some disclosed embodiments, the instructions that are executable can further cause the one or more processors to cause the multilingual sentence embedding system can further perform operations for obtaining a third sentence in a third language, obtaining a fourth sentence in a fourth language, encoding the third sentence and fourth sentence using the encoding module, determining the languages of the third encoded sentence and the fourth encoded sentence using a language discriminator, and updating the language discriminator based on the determined languages of the third encoded sentence and the fourth encoded sentence.

According to some disclosed embodiments, the third sentence can be the same as the first sentence and the fourth sentence is the same as the second sentence.

According to some disclosed embodiments, the third sentence can be the same as the first sentence and the fourth sentence is the same as the second sentence.

According to some disclosed embodiments, the determined language of the third encoded sentence can be different from the determined language of the fourth encoded sentence.

According to some disclosed embodiments, the determined language of the first encoded sentence can be the same as the determined language of the second encoded sentence.

According to some disclosed embodiments, determining the intent of the first encoded sentence can be based on an $L_2$-constrained softmax loss function.

According to some disclosed embodiments, determining the intent of the first encoded sentence can be based on a center loss function.

According to some disclosed embodiments, determining the intent of the first encoded sentence is based on a combination of an $L_2$-constrained softmax loss function and a center loss function.

Certain embodiments of the present disclosure relate to computer implemented method for sentence emdbedding. The method can include obtaining an encoding model, obtaining a first sentence in a first language and a label associated with the first sentence, obtaining a second sentence in a second language, encoding the first sentence and second sentence using the encoding model, determining the intent of the first encoded sentence, determining the language of the first encoded sentence and the language of the second encoded sentence, and updating the encoding model based on the determined intent of the first encoded sentence, the label, the determined language of the first encoded sentence, and the determined language of the second encoded sentence.

According to some disclosed embodiments, the first language and the second language can be different According to some disclosed embodiments, wherein the determined language of the first encoded sentence can be the same as the determined language of the second encoded sentence According to some disclosed embodiments, obtaining a third sentence in a third language, obtaining a fourth sentence in a fourth language, encoding the third sentence and fourth sentence using the encoding module, determining the languages of the third encoded sentence and the fourth encoded sentence using a language discriminator, and updating the language discriminator based on the determined languages of the third encoded sentence and the fourth encoded sentence.

According to some disclosed embodiments, the third sentence can be the same as the first sentence and the fourth sentence is the same as the second sentence.

According to some disclosed embodiments, the determined language of the third encoded sentence can be different from the determined language of the fourth encoded sentence.

According to some disclosed embodiments, determining the intent of the first encoded sentence can be based on a combination of an $L_2$-constrained softmax loss function and a center loss function.

Certain embodiments of the present disclosure relate to a multilingual sentence embedding system. The multilingual sentence embedding system can include one or more memory devices storing processor executable instructions, and one or more processors configured to execute the instructions to cause the multilingual sentence embedding system to perform operation. The operations can include obtaining an encoding model, obtaining a first sentence in a first language and a label associated with the first sentence, obtaining a second sentence in a second language, encoding the first sentence and second sentence using the encoding model, determining the intent of the first encoded sentence, determining the language of the first encoded sentence and the language of the second encoded sentence, and updating the encoding model based on the determined intent of the first encoded sentence, the label, the determined language of the first encoded sentence, and the determined language of the second encoded sentence.

According to some disclosed embodiments, the one or more processors are configured to execute the instructions to cause the multilingual sentence embedding system can further perform operations for obtaining a third sentence in a third language, obtaining a fourth sentence in a fourth language, encoding the third sentence and fourth sentence using the encoding module, determining the languages of the third encoded sentence and the fourth encoded sentence using a language discriminator, and updating the language discriminator based on the determined languages of the third encoded sentence and the fourth encoded sentence.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous details are set forth to provide a thorough understanding of the disclosed example embodiments. It is understood by those skilled in the art that the principles of the example embodiments may be practiced without every specific detail. The embodiments disclosed are exemplary and are intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for improved multilingual sentence embeddings. The disclosed embodiments include methods and techniques for training embedding models to better handle multilingual data. The disclosed embodiments can reduce the effects of lexical similarity bias in multilingual encoders to represent semantic similarity of the data more accurately. These embodiments can utilize monolingual training data to train the model and can be used to generate embeddings for multilingual data. The embodiments disclosed herein utilize a semantic classifier that can label sentence embeddings. Additionally, the embodiments described herein can use a language discriminator to compare sentences encoded form different languages compared to labeled data. Based in the results from the language discriminator, the model of the embodiments disclosed herein can be tuned. If the language discriminator can distinguish the languages of a sentence encoded from two or more languages, then the sentence embeddings are not providing an optimal encoding of the sentences. By tuning the model, the embodiments disclosed herein can render the language discriminator unable to distinguish between encodings from different input languages, indicating that the sentence embeddings are capturing the intended meaning of the sentences. Through this process of adversarial training, the embodiments described herein can be tuned to provide more accurate sentence embeddings of multilingual data using only monolingual labeled training data.

Figure 1:
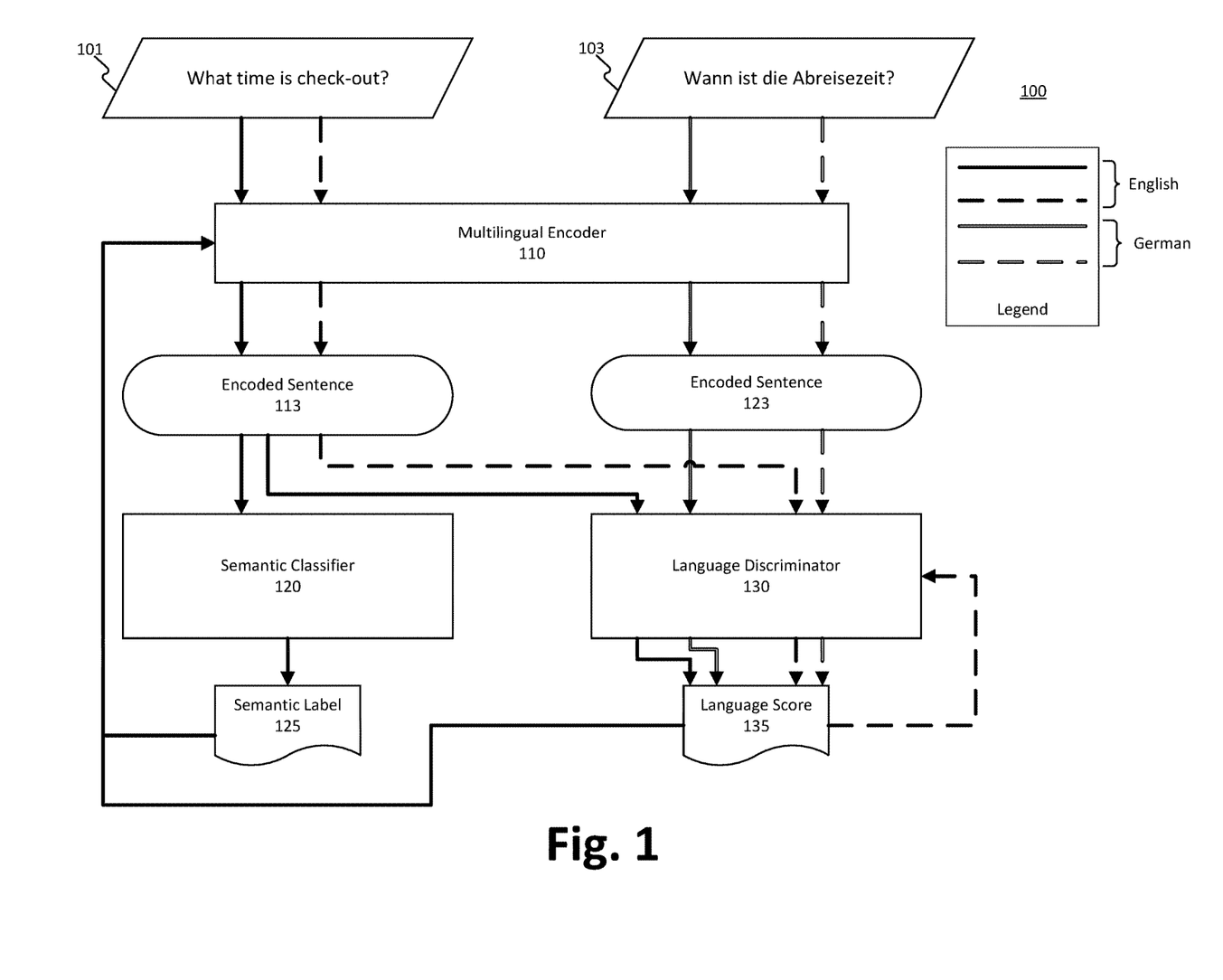
FIG. 1 is a block diagram showing various exemplary components of a multilingual sentence embedding system, consistent with embodiments of the present disclosure.

FIG. 1 is a block diagram showing various exemplary components of a multilingual sentence embedding system 100, consistent with embodiments of the present disclosure. Multilingual sentence embedding system 100 can use sentences in multiple languages as input such as English sentence 101 and German sentence 103. Both sentence 101 and sentence 103 can represent the same intent, e.g., requesting the time for check out from a hotel. The input sentences can include labeled data. For example, sentence 101 can be labeled as having an intent of check-out. Additional examples of sentence intents are shown in FIG. 2.

Figure 2:
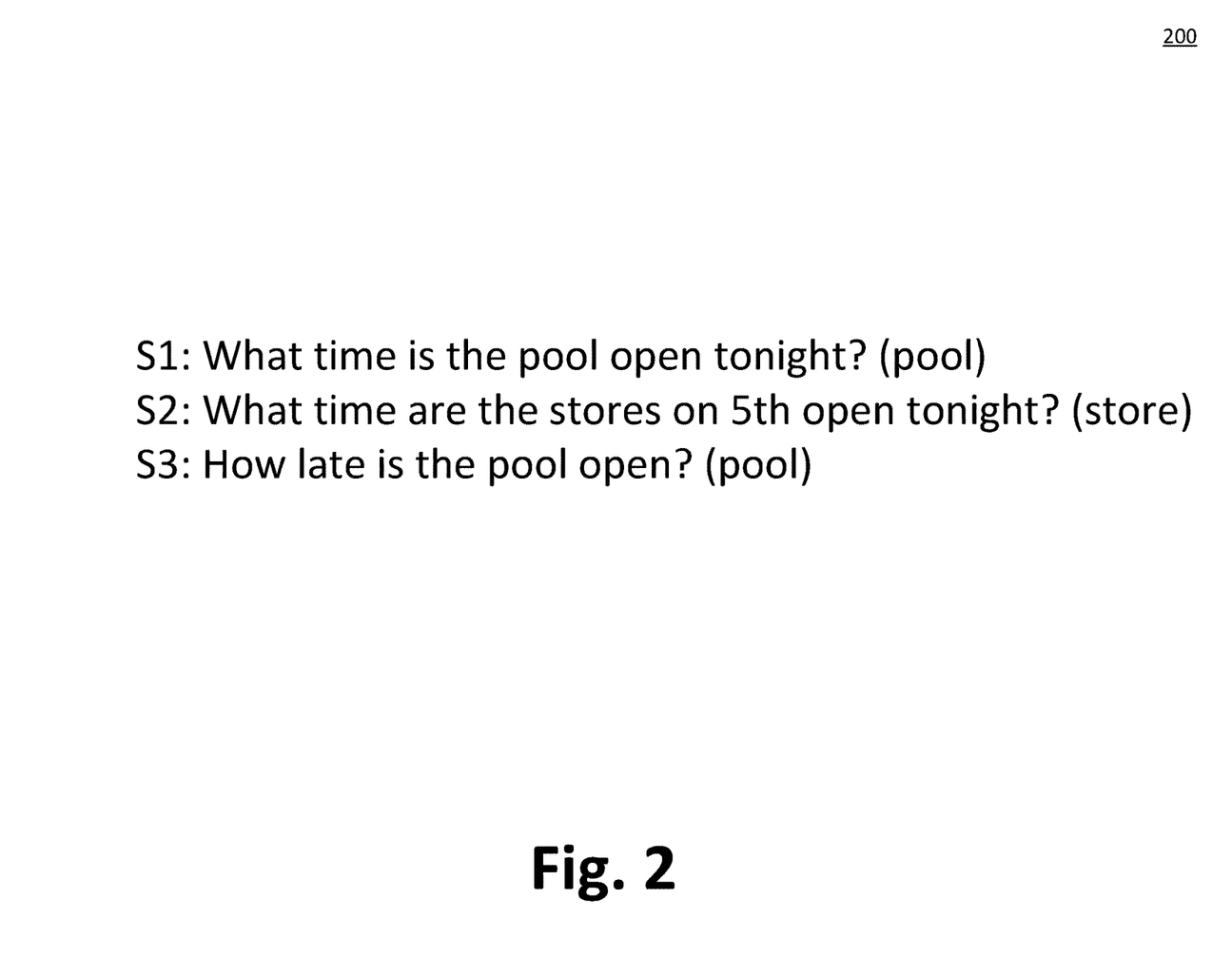
FIG. 2 is a diagram showing an exemplary labeled training data, consistent with embodiments of the present disclosure.

FIG. 2 is an example of labeled sentence data showing expected intent. For example, sentence S1 and S3 relate to questions about the open hours for a swimming pool. Sentence S2 relates to the opening hours of a store. When the sentences are embedding, the similarity, as determined by calculating the cosine similarity of the sentences, can indicate that S1 and S2 are more likely related than S1 and S3 because of textual similarity of the sentences. But as shown in FIG. 2, S1 is labeled as related to a pool and S2 is labeled as related to the store. As shown in the example, S1 and S3 are more similar because the sentences both ask for opening hours of a pool even though they are phrased differently. This phenomenon can be referred to as textual similarity bias because an embedding of similar words in different languages can be correlated even though the overall intent of the sentences containing those words differ. Multilingual sentence embedding system 100 of FIG. 1 can utilize the sentences shown in FIG. 2 but can reduce textual similarity bias so that the cosine similarity of S1 and S3 would be higher than the cosine similarity of S1 and S2 regardless of the language in which the sentences are written.

Returning to FIG. 1, multilingual sentence embedding system 100 can process sentences 101 and 103. As shown in the legend, the solidly shaded lines can represent the path of English sentence 101 through multilingual sentence embedding system 100. The non-solidly shaded lines can represent the path of German sentence 103 through multilingual sentence embedding system 100. Additionally, the dashed lines (both solid and double dashed lines) can represent how sentences 101 and 103, respectively, can be used by multilingual sentence embedding system 100 to train language discriminator 130, described in more detail below. The solid lines (both single and double solid lines) can represent how sentences 101 and 103, respectively, can be used by multilingual sentence embedding system 100 to train multilingual encoder 110 and semantic classifier 120, both described in more detail below. In some embodiments, sentences 101 and 103 can have differing meaning or intent. In these embodiments, sentences 101 and 103 can be used for adversarial training of multilingual encoder 110, described in more detail below.

Multilingual encoder 110 can process sentences 101 and 103 and generate sentence embeddings for each sentence. Multilingual encoder 110 can be a language-agnostic sentence encoder that can encode sentences in any language into a common vector space. In some embodiments, multilingual encoder 110 can utilize the LASER encoder. In other embodiments, multilingual encoder 110 can utilize multilingual models for BERT. Multilingual encoder can take a sentence as input and process each word token in the sentence to generate a vector representing the token and the sentence as encoded sentence 113 or encoded sentence 123. Encoded sentence 113 can represent the embedding generated by multilingual encoder 110 from sentence 101. Encoded sentence 123 can represent the embedding generated by multilingual encoder 110 from sentence 103. Sentences 101 and 103 that result in similar embeddings, e.g., encoded sentence 113 and encoded sentence 123, determined by comparing their cosine similarity, can be considered to have the same meaning or intent.

The specific embeddings generated by multilingual sentence embedding system 100 can change as multilingual embeddings system 100 is trained to better represent the input sentences. Multilingual sentence embedding system 100 can utilize an iterative training approach based on output from semantic classifier 120 and language discriminator 130 represented as semantic label 125 and language score 135 respectively. Multilingual encoder 110 can receive semantic labels 125 and language scores 135, represented by the dotted and dashed single lines in FIG. 1. The training is described in more detail below. As multilingual encoder 110 is trained, multilingual encoder 110 can reprocess the same sentence, e.g., sentence 101, but produce a different representation as, for example, encoded sentence 113. The training process can be repeated until multilingual encoder 110 no longer produces improved or different encodings for sentences 101 and 103 as, for example, encoded sentence 113 and 123 respectively.

Semantic classifier 120 can receive encoded sentence 113 representing embeddings for sentence 101. Semantic classifier can label encoded sentence 113 indicating the predicted meaning, intent, or topic of sentence 101. For example, as shown previously in relation to FIG. 2, semantic classifier 120 can determine the topic for sentences S1 and S3 of FIG. 2 to be "pool" and the topic for sentence for S2 of FIG. 2 to be "store." Returning to FIG. 1, semantic classifier 120 can, in some embodiments, classify sentences based on intent instead of just topic. For example, sentence classifier 120 may determine the intent of sentence 101 to be "seeking hotel information." In this embodiment, sentence classifier 120 could determine the intent of sentences S1 and S3 of FIG. 2 to be "seeking pool information" and the intent of sentence S2 of FIG. 2 to be "seeking store information."

Sentence classifier can use a loss function to establish the classification of sentences. Loss functions can provide a model with an evaluation of how well the model is classifying input data. In some embodiments, sentence classifier can use an $L_2$-constrained softmax loss function. The $L_2$-constrained softmax loss function can aim to minimize the following expression:

$$-\frac{1}{M}\sum_{i=1}^{M}\log\frac{e^{W_{y_i}^T u_i + b_{y_i}}}{\sum_{j=1}^{C} e^{W_j^T u_i + b_j}}$$

Further, the above expression is subject to the following:

$$\|u_i\|_2 = \alpha, \ \forall i = 1, \ldots, M$$

where C and M denote the number of classes and training samples respectively. $u_i$ and $y_i$ are the i-th sentence embedding vector of, for example, encoded sentence 113 and its actual (as opposed to predicted) label. W is a trainable weight matrix for classification. $\|u_i\|_2$ is the L2-norm of the vector and a is the radius of a hypersphere, which is manually configured prior to the use of the system or can be automatically determined during the training procedure using a hyper-parameter optimization tool such as hyperopt or optuna. In this example, the $L_2$ as constraint can ensure that embeddings, such as encoded sentence 113, are distributed on a hypersphere with size a. Accordingly, in this example, the Euclidean distance between two encoded sentences, represented as vectors on the hypersphere, is close to the cosine distance. In these embodiments, this property can aid in the determination of cosine similarity of encoded sentences.

In some embodiments, semantic classifier 120 can utilize a center loss function to classify encoded sentence 113. The center loss function can be described as:

$$L_{center} = \frac{1}{2}\sum_{i=1}^{m}\|u_i - c_{y_i}\|_2^2,$$

where $c_{y_i}$ denotes the centroid of sentence embedding vectors of class $y_i$. This loss function can cause multilingual encoder 110 to form the embeddings into compact clusters representing the intent of the input sentences, e.g., sentence 101 represented as encoded sentence 113. In some embodiments, where multilingual training data is available, the center loss function can function on sentence embeddings in any language to determine an intent classification.

In some embodiments, both the $L_2$-constrained loss function and the center loss function described above can be combined using a hyper parameter 2. This combination can be described with the following equation:

$$L_C = L_{L2-sm} + \lambda L_{center}$$

where $L_{L2-sm}$ represents the $L_2$-constrained softmax loss function and $L_{center}$ represents the center loss function. λ can be manually configured or automatically determined using a hyper-parameter optimization tool such as hyperopt or optuna.

Semantic classifier 120 can output the result of the loss function and classification as semantic label 125. Semantic label 125 can be returned to multilingual encoder 110 to assist with the iterative training of multilingual encoder 110. For example, as multilingual encoder 110 is updated by different parts of multilingual sentence embedding system 100, semantic label 125 can indicate, based on the loss function and classification from semantic classifier 120, if those changes are improving the accuracy of encoded sentence 113 based on training data.

Multilingual sentence embedding system 100 can also include language discriminator 130. Language discriminator 130 can receive sentence embeddings, e.g. encoded sentences 113 and 123, and determine if the languages of encoded sentences 113 and 123 are the same or different. Language discriminator 130 can receive the sentence encodings (e.g., represented as the solid single and double lines from encoded sentence 113 and encoded sentence 123 respectively) and output as a language score the languages of the two encoded sentences. If the language discriminator 130 has difficulty distinguishing between the languages, then the encodings output by multilingual encoder 110 (i.e., encoded sentences 113 and 123) are considered to be more accurate. These scores can be returned to multilingual encoder 110 for use in the iterative training of multilingual encoder 110.

Additionally, language discriminator 130 can be used to better distinguish the language of sentences. This process can be referred to as adversarial training. Language discriminator 130 can receive encoded sentences 113 and 123 generated from a loss function within multilingual encoder 110. Multilingual sentence embedding system 100 can generate a language score 135 from those encoded sentences. The result can be used to train language discriminator 130 to better distinguish between encoded sentences 113 and 123. As semantic classifier is used to train multilingual encoder to more accurately label encoded sentence 113 and generate encodings that confuse language discriminator 130, language discriminator 130 can be trained so that confusing language discriminator 130 is more difficult resulting in better training of multilingual encoder 110.

The loss function used to adversely train language discriminator 130 can be represented as:

$$L_{D_t} = L_d(1, D_t(u^t)) + L_d(0, D_t(v^l))$$

where $L_{D_t}$ is the cross-entropy loss. $u_t$ and $v_t$ are embedding vectors (e.g., encoded sentences 113 and 123) in languages t and l (e.g., English and German respectively as shown in FIG. 1). Multilingual sentence embedding system 100 can utilize different language discriminators for different languages, t. For example, language discriminator 130 can be an English-language discriminator, a German-language discriminator, or a discriminator in another language. In some embodiments, Multilingual sentence embedding system 100 can utilize a plurality of language discriminators simultaneously.

The loss functions for both semantic classifier 120 and language discriminator 130 can be combined to tune multilingual encoder 110. This can allow multilingual encoder to generate multilingual sentence embeddings for sentences in multiple language that cannot be accurately classified by language discriminator 130. The combined loss function can be represented as:

$$L_{C+D_t} = L_C - \gamma L_{D_t}$$

where $\gamma$ is a hyper-parameter used to balance the loss function and $L_C$ and $L_{D_t}$ refer to the loss functions previously described for semantic classifier 120 and language discriminator 130. $\gamma$ can be manually configured or automatically determined using a hyper-parameter optimization tool such as hyperopt or optuna.

Figure 3:
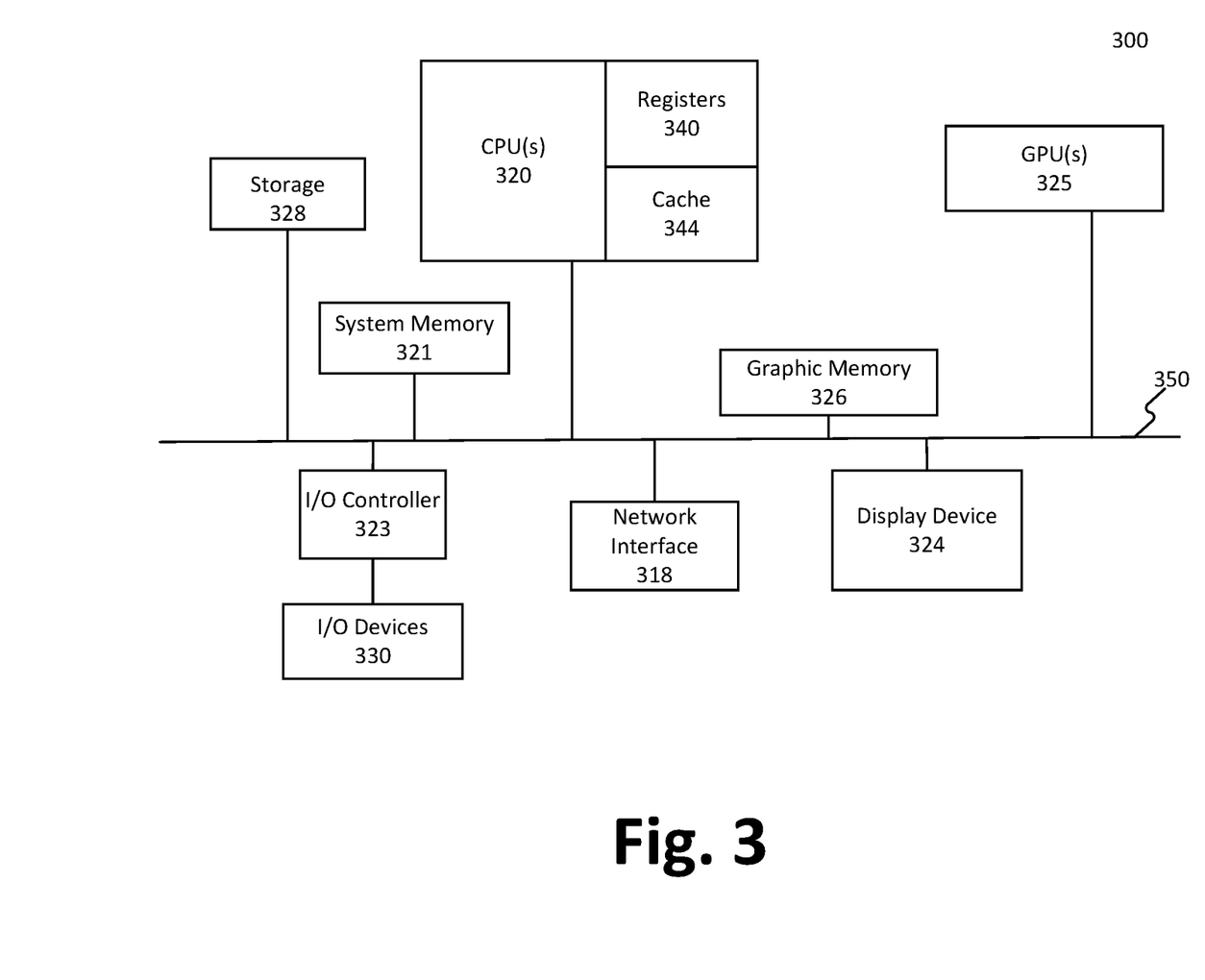
FIG. 3 is a block diagram of an exemplary computing device, consistent with embodiments of the present disclosure.

FIG. 3 is a block diagram of an exemplary computing device 300, consistent with embodiments of the present disclosure. In some embodiments, computing device 300 can be a specialized server providing the functionality described herein. In some embodiments, components of multilingual embedding system 100, such sentence 101, sentence 103, multilingual encoder 110, encoded sentence 113, encoded sentence 123, semantic classifier 120, language discriminator 130, semantic label 125, and language score 135 can be implemented using the computing device 300 or multiple computing devices 300 operating in parallel. Further, the computing device 300 can be a second device providing the functionality described herein or receiving information from a server to provide at least some of the described functionality. Moreover, the computing device 300 can be an additional device or devices that store or provide data consistent with embodiments of the present disclosure and, in some embodiments, computing device 300 can be a virtualized computing device such as a virtual machine, multiple virtual machines, or a hypervisor.

Computing device 300 can include one or more central processing units (CPUs) 320 and a system memory 321. Computing device 300 can also include one or more graphics processing units (GPUs) 325 and graphic memory 326. In some embodiments, computing device 300 can be a headless computing device that does not include GPU(s) 325 or graphic memory 326.

CPUs 320 can be single or multiple microprocessors, field-programmable gate arrays, or digital signal processors capable of executing sets of instructions stored in a memory (e.g., system memory 321), a cache (e.g., cache 341), or a register (e.g., one of registers 340). CPUs 320 can contain one or more registers (e.g., registers 340) for storing various types of data including, inter alia, data, instructions, floating-point values, conditional values, memory addresses for locations in memory (e.g., system memory 321 or graphic memory 326), pointers and counters. CPU registers 340 can include special-purpose registers used to store data associated with executing instructions such as an instruction pointer, an instruction counter, or a memory stack pointer. System memory 321 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 321 can be one or more memory chips capable of storing data and allowing direct access by CPUs 320. System memory 321 can be any type of random-access memory (RAM), or other available memory chip capable of operating as described herein.

CPUs 320 can communicate with system memory 321 via a system interface 350, sometimes referred to as a bus. In embodiments that include GPUs 325, GPUs 325 can be any type of specialized circuitry that can manipulate and alter memory (e.g., graphic memory 326) to provide or accelerate the creation of images. GPUs 325 can have a highly parallel structure optimized for processing large, parallel blocks of graphical data more efficiently than general-purpose CPUs 320. Furthermore, the functionality of GPUs 325 can be included in a chipset of a special purpose processing unit or a co-processor.

CPUs 320 can execute programming instructions stored in system memory 321 or other memory, operate on data stored in memory (e.g., system memory 321), and communicate with GPUs 325 through the system interface 350, which bridges communication between the various components of the computing device 300. In some embodiments, CPUs 320, GPUs 325, system interface 350, or any combination thereof, are integrated into a single chipset or processing unit. GPUs 325 can execute sets of instructions stored in memory (e.g., system memory 321), to manipulate graphical data stored in system memory 321 or graphic memory 326. For example, CPUs 320 can provide instructions to GPUs 325, and GPUs 325 can process the instructions to render graphics data stored in the graphic memory 326. Graphic memory 326 can be any memory space accessible by GPUs 325, including local memory, system memory, on-chip memories, and hard disk. GPUs 325 can enable displaying of graphical data stored in graphic memory 326 on display device 324 or can process graphical information and provide that information to connected devices through network interface 318 or I/O devices 330.

Computing device 300 can include a display device 324 and input/output (I/O) devices 330 (e.g., a keyboard, a mouse, or a pointing device) connected to I/O controller 323. I/O controller 323 can communicate with the other components of computing device 300 via system interface 350. It should now be appreciated that CPUs 320 can also communicate with system memory 321 and other devices in manners other than through system interface 350, such as through serial communication or direct point-to-point communication. Similarly, GPUs 325 can communicate with graphic memory 326 and other devices in ways other than system interface 350. In addition to receiving input, CPUs 320 can provide output via I/O devices 330 (e.g., through a printer, speakers, bone conduction, or other output devices).

Furthermore, the computing device 300 can include a network interface 318 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 318 can comprise a built-in network adapter, network interface card, PCMCIA network card, card bus network adapter, wireless network adapter, USB network adapter, modem or any other device suitable for interfacing the computing device 300 to any type of network capable of communication and performing the operations described herein.

Figure 4:
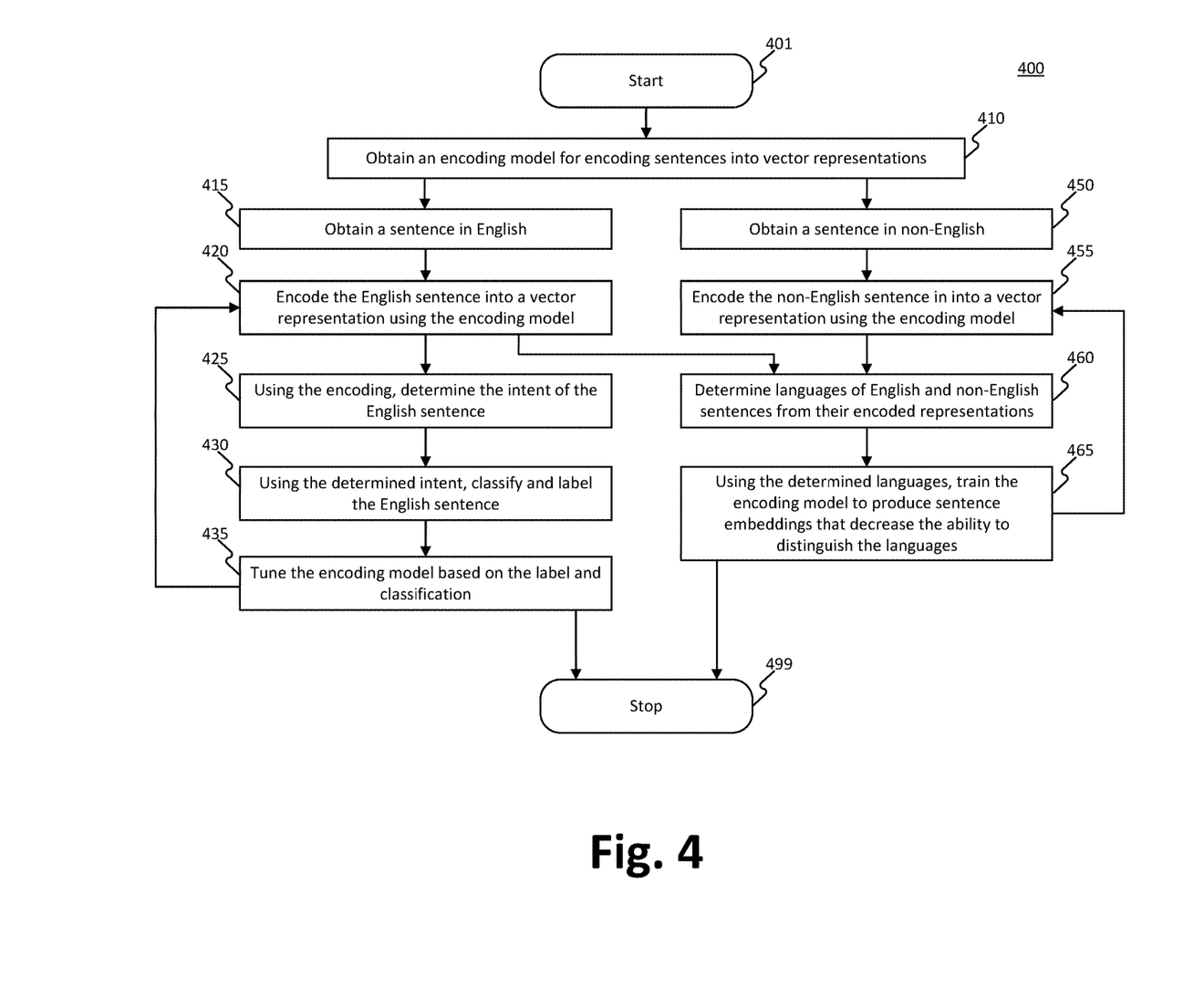
FIG. 4 is a flowchart showing an exemplary method for training a multilingual sentence embeddings model, consistent with embodiments of the present disclosure.

FIG. 4 is a flowchart showing an exemplary training method 400 for training a multilingual sentence embeddings model, consistent with embodiments of the present disclosure. The steps of training method 400 can be performed by multilingual sentence embedding system 100 of FIG. 1 executing on or otherwise using the features of computing device 300 of FIG. 3 for purposes of illustration. It is appreciated that the illustrated training method 400 can be altered to modify the order of steps and to include additional steps.

Training method 400 begins at step 401. At step 410, multilingual sentence embedding system 100 can obtain an encoding model for generating sentence embeddings. The embeddings can include vector representations of the sentences and words or tokens within the sentence. At step 415, multilingual sentence embedding system 100 can obtain a sentence in English. It is understood by one of skill in the art that English is intended as an exemplary language and the sentence obtained in step 410 can be in any language.

At step 420, the sentence obtained in step 415 can be encoded into sentence embeddings represented as a vector for the sentence and tokens in the sentence. The encoding can be performed by multilingual encoder 110. Multilingual encoder 110 can output the encoded sentence as encoded sentence 113. Encoded sentence 113 can be provided to semantic classifier 120 at step 425 and language discriminator 130 at step 460, which is described in more detail below.

At step 425, multilingual sentence embedding system 100 can determine the intent of the original sentence. Semantic classifier 120 can process encoded sentence 113 to determine the intent of sentence 101. The intent, as described in relation to FIG. 2, can indicate the meaning or purpose of the sentence. As previously described, sentence classifier 120 can be trained to reduce the occurrence of textual similarity bias. At step 430, semantic classifier can additionally classify the determined intent and label the sentence based on the determined intent and classification. The label and classification information, represented as, for example, semantic label 125, can be used to further improve the original sentence embeddings.

At step 435, multilingual sentence embedding system 100 can use the label and classification information, e.g., semantic label 125 to tune the encoding model used in multilingual encoder 110. The label and classification can be compared with known training data to assess the accuracy of the information generated by semantic classifier 120 as an indication of the accuracy of the embeddings embodied in encoded sentence 113.

In some embodiments, if no additional training is needed, steps 425-435 of method 400 can stop at method 499. In other embodiments, the method can be repeated to iteratively fine tune the model used in multilingual encoder 110 at step 420 to produce more accurate sentence embeddings (e.g., encoded sentences 113 and 123).

Steps 450 to 465 can occur concurrently with steps 415 to 435, prior to steps 415 to 435, or after steps 415-435. In step 450, multilingual sentence embedding system 100 can obtain a sentence, e.g., sentence 103. The sentence can be a non-English sentence. It is appreciated by one of ordinary skill in the art that a sentence in a language other than English can be used. The sentence can be different than the sentence obtained in step 415 (e.g., sentence 101 and 103 can be in different languages).

At step 455, the sentence obtained in step 450 can be encoded into sentence embeddings represented as a vector for the sentence and tokens in the sentence. The encoding can be performed by multilingual encoder 110. Multilingual encoder 110 can output the encoded sentence as encoded sentence 123.

At step 460, the language associated with encoded sentences 113 and 123 can be determined by, for example, language discriminator 130. Language discriminator 130 can attempt to distinguish between the language of encoded sentence 113 and encoded sentence 123. Language discriminator 130 can receive the output of encoding sentences 101 and 103 from steps 420 and 455, respectively. If step 420 has not yet run, method 400 can cause multilingual sentence embedding system 100 to process sentence 103 and generate encoded sentence 113 as described in step 420. That output can then be sent to language discriminator 130 in step 460. If language discriminator 130 cannot determine any difference in the languages, it can indicate that the multilingual embeddings generated by multilingual encoder 110, e.g., encoded sentences 113 and 123, are language agnostic This can result in embeddings for one language being indistinguishable from embeddings generated from the same sentence in a different language.

At step 465, multilingual sentence embedding system 100 can train multilingual encoder 110. In step 465, multilingual sentence embedding system 100 can analyze the determined languages. Based on the determined languages, multilingual sentence embedding system 100 can train the model used by multilingual encoder 110. The purpose of the training can be to cause language discriminator 130 to have difficulty determining the language of, for example, encoded sentences 113 and 123. If language discriminator 130 cannot accurately discern the difference in languages between encoded sentences 113 and 123 at step 465, it can indicate that updates to the model used by multilingual encoder 110 is not increasing the textual similarity bias of the model and can indicate that training of the model on monolingual training data is not disrupting multilingual encoder 110's ability to accurately encode sentences in other languages.

In some embodiments, if no additional training is needed, steps 455-465 of method 400 can stop at method 499. In other embodiments, the method can be repeated to iteratively fine tune the model used in multilingual encoder 110 at step 455 and 420 to produce more accurate sentence embeddings (e.g., encoded sentences 113 and 123).

Figure 5:
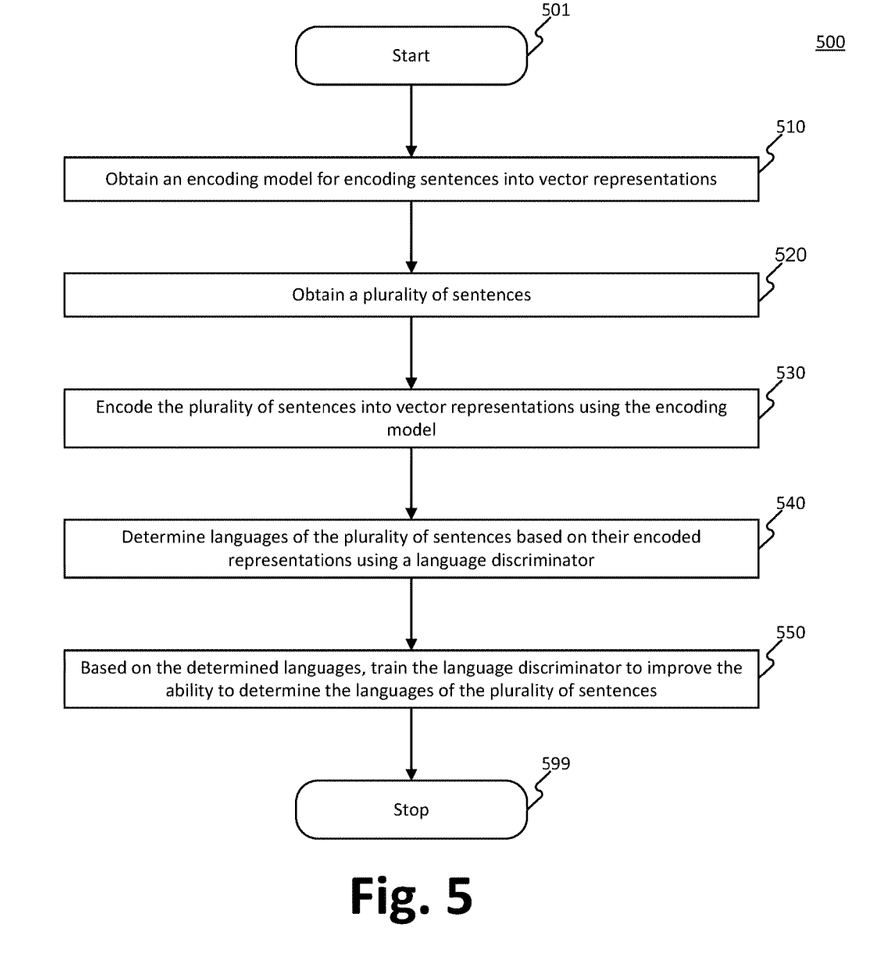
FIG. 5 is a flowchart showing an exemplary method for adversarial training of a language discriminator, consistent with embodiments of the present disclosure.

FIG. 5 is a flowchart showing an exemplary adversarial training method 400 for training a language discriminator, consistent with embodiments of the present disclosure. The steps of training method 500 can be performed by multilingual sentence embedding system 100 of FIG. 1 executing on or otherwise using the features of computing device 300 of FIG. 3 for purposes of illustration. It is appreciated that the illustrated training method 500 can be altered to modify the order of steps and to include additional steps.

Training method 500 begins at step 501. At step 510, multilingual sentence embedding system 100 can obtain an encoding model for generating sentence embeddings. The embeddings can include vector representations of the sentences and words or tokens within the sentence. At step 520, multilingual sentence embedding system 100 can obtain a plurality of sentences. In some embodiments, the plurality of sentences can be in the same language. In other embodiments, the plurality of sentences can be in different languages. In yet other embodiments, the plurality of sentences can be a mix of the same and different languages.

At step 530, the sentences obtained in step 520 can be encoded into sentence embeddings represented as a vector for each sentence and for the tokens in the sentence. The encoding can be performed by multilingual encoder 110. Multilingual encoder 110 can output the encoded sentence as, for example encoded sentence 113, 123, and other encoded sentences not shown in FIG. 1.

At step 540, the encoded sentences, e.g., encoded sentence 113 and 123, can be provided to language discriminator 130. Language discriminator 130 can process the encoded sentences and determine the language of each sentence based on the encoded representation.

At step 550, language discriminator 130 can use the languages determined in step 540 to train language discriminator 130. As more encoded sentences are processed, the determined languages can be compared to known or labeled data for the sentences and language discriminator 130 can be trained to better distinguish sentence languages.

At step 599, if no additional training or processing is needed, method 500 can stop. When used in conjunction with method 400, method 500 can provide valuable adversarial training to multilingual sentence embedding system 100. As method 400 is being used to generate sentence embeddings that confuse language discriminator 130, method 500 can be used to train language discriminator 130 to minimize the error in predicting the language. By making language discriminator 130 more robust, method 500 can cause method 400 to produce better sentence encodings because method 400 can be caused to account for the improved ability of language discriminator 130 to differentiate between languages of the encoded sentences.

Figure 6:
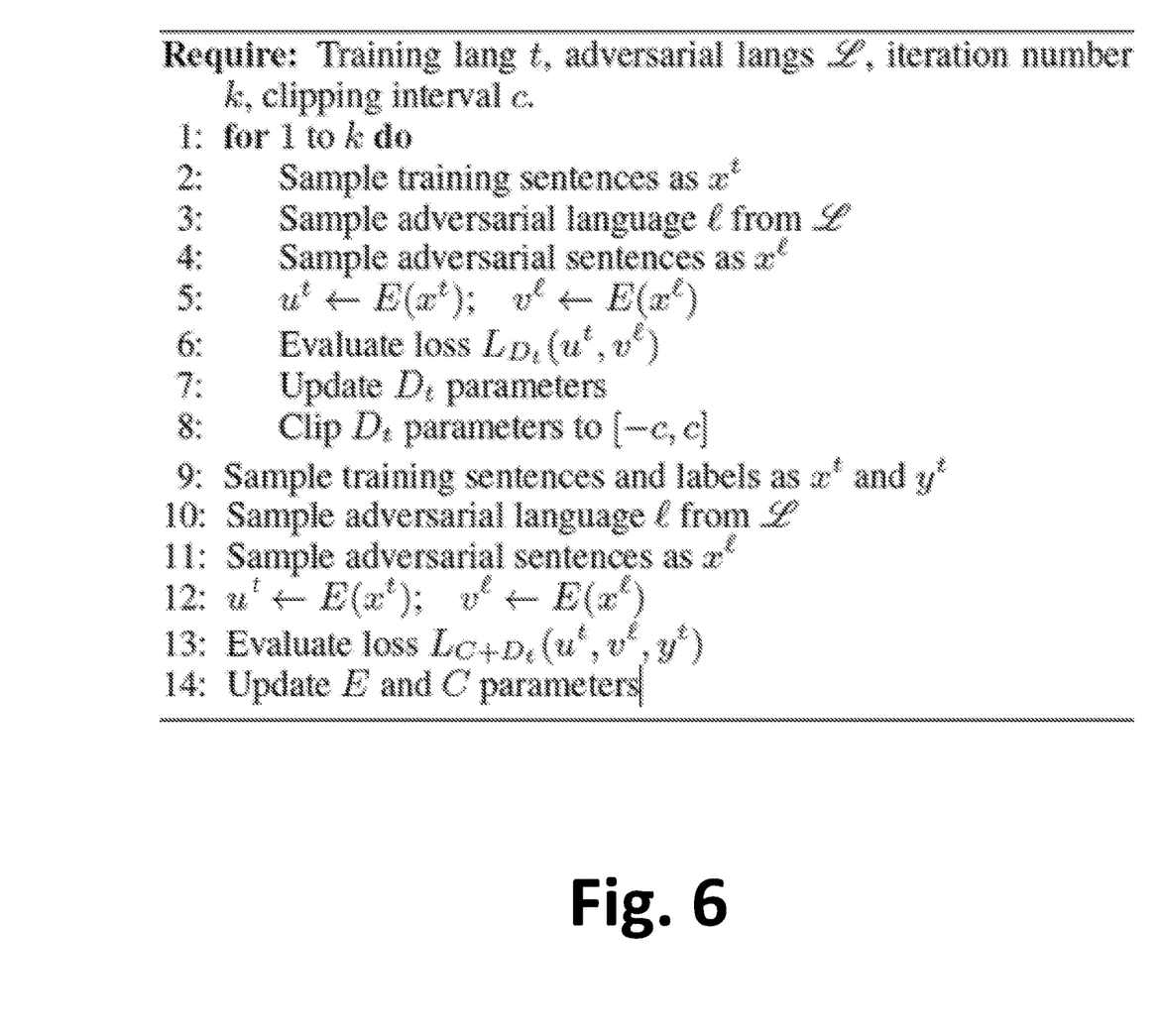
FIG. 6 is an exemplary algorithm step for training a multilingual sentence embeddings model.

FIG. 6 is an exemplary algorithm 600 of an iterative training process for training a multilingual sentence embeddings model, e.g., the model used in multilingual sentence embedding system 100. The steps of algorithm 600 can be performed by multilingual sentence embedding system 100 of FIG. 1 executing on or otherwise using the features of computing device 300 of FIG. 3 for purposes of illustration. It is appreciated that the illustrated algorithm 600 can be altered to modify the order of steps and to include additional steps. Additionally, algorithm 600 can represent a single step of an iterative process. It is appreciated by one of ordinary skill in the art that algorithm 600 is represented as pseudo-code and could be implemented in any programming or scripting languages (e.g., Python, R, C, Scala, Java, or others).

Algorithm 600 can include a training language represented as t, adversarial training languages represented as L, an iteration number k, and a clipping interval c. Additionally, E can refer to a function or process performed by multilingual encoder 110, D can refer to language discriminator 130, and C can refer to semantic classifier 120.

Line 1 of algorithm 600 can set up an iteration used for adversarial training of the language discriminator (e.g., language discriminator 130). Each step of the iteration can be referred to as the kth step in the iteration. At line 2, the algorithm obtains training sentences in language t represented as $x^t$ (e.g., sentence 101). At line 3, algorithm 600 can sample an adversarial language l from the set of adversarial languages L. At line 4, algorithm 600 can sample a sentence from l as $x^l$ (e.g., sentence 103).

At line 5 of algorithm 600, multilingual encoder 110, represented as E can encode $x^t$ and $x^l$ to generate sentence embeddings $u^t$ and $v^l$ (e.g., encoded sentences 113 and 123).

At line 6 of the algorithm 600, $u^t$ and $v^l$ can be evaluated using the loss function associated with language discriminator 130, represented as $L_{Dt}(u^t, v^l)$. Using that result, the algorithm can update the parameters of language discriminator 130 at line 7 of algorithm 600 and clip or normalize the parameters at line 8 of algorithm 600. This process of updating and clipping the parameters trains the language discriminator.

After adversarial training of language discriminator 130, represented as the loop in lines 1 to 8 of algorithm 600, line 9 of algorithm 600 can cause multilingual sentence embedding system 100 to sample training sentences as $x^t$ (e.g. sentence 101). Additionally, multilingual sentence embedding system 100 can sample labels as $y^t$.

At line 10, algorithm 600 can sample an adversarial language l from the set of adversarial languages L. At line 11, algorithm 600 can sample a sentence from l as $x^l$ (e.g., sentence 103).

At line 12 of algorithm 600, multilingual encoder 110, represented as E can encode $x^t$ and $x^l$ to generate sentence embeddings $u^t$ and $v^l$ (e.g., encoded sentences 113 and 123).

At lines 13, algorithm 600 can cause multilingual sentence embedding system 100 to evaluate $u^i$ using semantic classifier 120 and $v^l$ using language discriminator 130. The combined loss function for evaluating result can be represented as $L_C+L_{D_t}$ ($u^i$, $v^l$, $y^t$). Using the result of the evaluation, algorithm 600 can cause multilingual encoder 110 to update the model and update semantic classifier 120.

Through the iterative training process described in algorithm 600, the model used by multilingual encoder 110 can be updated through both direct training and through adversarial training of language discriminator 130.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by a multilingual sentence embedding system that includes one or more processors to cause the multilingual sentence embedding system to perform a method for sentence embedding, the method comprising:
    obtaining an encoding model;
    obtaining a first sentence in a first language and a label associated with the first sentence, wherein the label is generated by a classifier;
    obtaining a second sentence in a second language;
    encoding the first sentence and second sentence using the encoding model, wherein the encoding model generates vectors of the first sentence and the second sentence;
    determining an intent of the first encoded sentence;
    determining the language of the first encoded sentence and the language of the second encoded sentence, wherein the determined languages are based on language scores generated for each of the first encoded sentence and the second encoded sentence; and updating the encoding model based on the determined intent of the first encoded sentence, the label, the language score of the first encoded sentence, and the language score of the second encoded sentence, wherein updating the encoding model comprises determining whether the determined language of the first encoded sentence and the determined language of the second encoded sentence are different.

2. The non-transitory computer readable storage medium of claim 1, wherein the first language and the second language are the same.

3. The non-transitory computer readable storage medium of claim 1, wherein the first language and the second language are different.

4. The non-transitory computer readable storage medium of claim 1, wherein the determined language of the first encoded sentence is the same as the determined language of the second encoded sentence.

5. The non-transitory computer readable storage medium of claim 1, wherein the instructions that are executable further cause the one or more processors to cause the multilingual sentence embedding system to further perform:
obtaining a third sentence in a third language;
obtaining a fourth sentence in a fourth language;
encoding the third sentence and fourth sentence using the encoding model;
determining the languages of the third encoded sentence and the fourth encoded sentence using a language discriminator; and
updating the language discriminator based on the determined languages of the third encoded sentence and the fourth encoded sentence.

6. The non-transitory computer readable storage medium of claim 5, wherein the third sentence is the same as the first sentence and the fourth sentence is the same as the second sentence.

7. The non-transitory computer readable storage medium of claim 6, wherein the determined language of the third encoded sentence is different from the determined language of the fourth encoded sentence.

8. The non-transitory computer readable storage medium of claim 7, wherein the determined language of the first encoded sentence is the same as the determined language of the second encoded sentence.

9. The non-transitory computer readable storage medium of claim 1, wherein determining the intent of the first encoded sentence is based on an $L_2$-constrained softmax loss function.

10. The non-transitory computer readable storage medium of claim 1, wherein determining the intent of the first encoded sentence is based on a center loss function.

11. The non-transitory computer readable storage medium of claim 1, wherein determining the intent of the first encoded sentence is based on a combination of an $L_2$-constrained softmax loss function and a center loss function.

12. A method performed for multilingual sentence embedding, the method comprising:
obtaining an encoding model;
obtaining a first sentence in a first language and a label associated with the first sentence, wherein the label is generated by a classifier;
obtaining a second sentence in a second language;
encoding the first sentence and second sentence using the encoding model, wherein the encoding model generates vectors of the first sentence and the second sentence;
determining an intent of the first encoded sentence;
determining the language of the first encoded sentence and the language of the second encoded sentence, wherein the determined languages are based on language scores generated for each of the first encoded sentence and the second encoded sentence; and
updating the encoding model based on the determined intent of the first encoded sentence, the label, the language score of the first encoded sentence, and the language score of the second encoded sentence, wherein updating the encoding model comprises determining whether the determined language of the first encoded sentence and the determined language of the second encoded sentence are different.

13. The method of claim 12, wherein the first language and the second language are different.

14. The method of claim 12, wherein the determined language of the first encoded sentence is the same as the determined language of the second encoded sentence.

15. The method of claim 12, further comprising:
obtaining a third sentence in a third language;
obtaining a fourth sentence in a fourth language;
encoding the third sentence and fourth sentence using the encoding model;
determining the languages of the third encoded sentence and the fourth encoded sentence using a language discriminator; and
updating the language discriminator based on the determined languages of the third encoded sentence and the fourth encoded sentence.

16. The method of claim 15, wherein the third sentence is the same as the first sentence and the fourth sentence is the same as the second sentence.

17. The method of claim 16, wherein the determined language of the third encoded sentence is different from the determined language of the fourth encoded sentence.

18. The method of claim 12, wherein determining the intent of the first encoded sentence is based on a combination of an $L_2$-constrained softmax loss function and a center loss function.

19. A multilingual sentence embedding system comprising:
one or more memory devices storing processor executable instructions; and
one or more processors configured to execute the instructions to cause the multilingual sentence embedding system to perform:
obtaining an encoding model;
obtaining a first sentence in a first language and a label associated with the first sentence, wherein the label is generated by a classifier;
obtaining a second sentence in a second language;
encoding the first sentence and second sentence using the encoding model, wherein the encoding model generates vectors of the first sentence and the second sentence;
determining an intent of the first encoded sentence;
determining the language of the first encoded sentence and the language of the second encoded sentence, wherein the determined languages are based on language scores generated for each of the first encoded sentence and the second encoded sentence; and
updating the encoding model based on the determined intent of the first encoded sentence, the label, the language score of the first encoded sentence, and the language score of the second encoded sentence, wherein updating the encoding model further comprises:
determining whether the determined language of the first encoded sentence and the determined language of the second encoded sentence are different.

20. The multilingual sentence embedding system of claim 19, wherein the one or more processors are configured to execute the instructions to cause the multilingual sentence embedding system to further perform:
obtaining a third sentence in a third language;
obtaining a fourth sentence in a fourth language;
encoding the third sentence and fourth sentence using the encoding model;
determining the languages of the third encoded sentence and the fourth encoded sentence using a language discriminator; and
updating the language discriminator based on the determined languages of the third encoded sentence and the fourth encoded sentence.

* * * * *